(12) United States Patent
Lee et al.

(10) Patent No.: US 7,912,419 B2
(45) Date of Patent: Mar. 22, 2011

(54) METHODS AND APPARATUSES FOR MEASURING TRANSMISSION QUALITY OF MULTIMEDIA DATA

(75) Inventors: Chul-Hee Lee, Seoul (KR); Sang-Woo Rhie, Seoul (KR); Won-Hee Sull, Seoul (KR); Dong-Won Na, Seongnam-si (KR); Hong-Seo Yun, Daejeon (KR); Sang-Ho Chae, Gwacheon-si (KR); Hyun-Joong Park, Seoul (KR); Joong-Yun Lee, Seoul (KR)

(73) Assignees: SK Telecom Co., Ltd., Seoul (KR); Yonsei University, Seoul (KR)

( * ) Notice: Subject to any disclaimer, the term of this patent is extended or adjusted under 35 U.S.C. 154(b) by 177 days.

(21) Appl. No.: 10/588,087

(22) PCT Filed: Jan. 28, 2005

(86) PCT No.: PCT/KR2005/000254
§ 371 (c)(1),
(2), (4) Date: Jul. 31, 2006

(87) PCT Pub. No.: WO2005/074175
PCT Pub. Date: Aug. 11, 2005

(65) Prior Publication Data
US 2007/0161351 A1    Jul. 12, 2007

(30) Foreign Application Priority Data
Jan. 30, 2004   (KR) .................. 10-2004-0006338

(51) Int. Cl.
*H04H 20/71*    (2008.01)
(52) U.S. Cl. ................ 455/3.01; 455/3.06; 455/452.2; 455/63.1; 455/67.13

(58) Field of Classification Search .............. 455/69, 455/3.01–3.06, 452.2, 63.1, 67.13, 68–70; 725/62–65, 95, 96
See application file for complete search history.

(56) References Cited

U.S. PATENT DOCUMENTS
6,351,733 B1 * 2/2002 Saunders et al. ............ 704/500
6,792,470 B2 * 9/2004 Hakenberg et al. ......... 709/232
(Continued)

FOREIGN PATENT DOCUMENTS
EP    1424802    6/2004
(Continued)

OTHER PUBLICATIONS
International Search Report dated Jun. 20, 2005 for PCT/KR2005/000254. Japanese Office Action for application No. 2006-550949, citing the attached references.

*Primary Examiner* — Edward Urban
*Assistant Examiner* — Fayyaz Alam
(74) *Attorney, Agent, or Firm* — Howe Hauptman Ham & Berner LLP (57) ABSTRACT

Methods and apparatuses for measuring transmission quality of multimedia data are provided. The method comprises the steps of a transmitter transmitting multimedia data through a channel, a receiver, having received the multimedia data from the transmitter, transmitting information on transmission error of the multimedia data to the transmitter through a return channel, the transmitter estimating the received data at the receiver using the error information returned to the transmitter, and the transmitter evaluating the transmission quality of the received data by comparing the estimated received data with reference data.

19 Claims, 6 Drawing Sheets

U.S. PATENT DOCUMENTS

| | | | |
|---|---|---|---|
| 2002/0002709 A1* | 1/2002 | An | 725/109 |
| 2002/0044531 A1* | 4/2002 | Cooper et al. | 370/248 |
| 2002/0076084 A1* | 6/2002 | Tian et al. | 382/100 |
| 2003/0036361 A1* | 2/2003 | Kawai et al. | 455/69 |
| 2004/0012675 A1* | 1/2004 | Caviedes | 348/180 |
| 2006/0110067 A1* | 5/2006 | Kahan | 382/286 |
| 2006/0276983 A1* | 12/2006 | Okamoto et al. | 702/69 |
| 2008/0123578 A1* | 5/2008 | Golitschek Edler Von Elbwart et al. | 370/312 |

FOREIGN PATENT DOCUMENTS

| | | |
|---|---|---|
| JP | 10-98437 | 4/1998 |
| JP | 2000-341322 | 12/2000 |
| JP | 2003-174485 | 6/2003 |
| JP | 2004-023145 | 1/2004 |
| WO | WO 01/54417 | 7/2001 |

* cited by examiner

METHODS AND APPARATUSES FOR MEASURING TRANSMISSION QUALITY OF MULTIMEDIA DATA

CROSS REFERENCE TO RELATED APPLICATION

This application is the National Phase application of International Application No. PCT/KR2005/000254, filed Jan. 30, 2005, which designates the United States and was published in English. This application, in its entirety, is incorporated herein by reference.

TECHNICAL FIELD

The present invention relates to methods and apparatuses for measuring transmission quality of multimedia data, which allow transmission quality to be measured at the transmitter that transmits the multimedia data.

BACKGROUND ART

Currently, as multimedia transmission services, such as VOD (video on demand) or video phones, are becoming widely available, monitoring transmission quality, which has traditionally been performed on a receiver in order to detect errors of transmitted multimedia data, is becoming an important issue. Particularly, in multimedia data service through wireless communication channels which have high error occurrence rates, it is important to control errors by monitoring transmission quality in order to provide reliable picture transmission service.

In wireless communications, the degrees of distortion and error occurrence in received multimedia data vary depending on the location of a receiver. When the transmission quality of multimedia data is not satisfactory at a receiver, customers may be unsatisfied and it is meaningless to continue transmitting such low-quality multimedia data through a noisy channel. Therefore, when a transmitter transmits multimedia data, it is necessary to take proper measures for improving transmission reliability.

Video quality monitoring methods include a FR (full-reference) method, a RR (reduced-reference) method, and a NR (noreference) method.

The full-reference method is known as the most accurate method for measuring video quality because it uses both reference (source) video and processed video sequences. However, since the full-reference method requires the reference video, its application area is limited.

In the reduced-reference method, a set of parameters are extracted from a reference video sequence and the set of extracted parameters is transmitted to a receiver along with video data. At the receiver, another set of parameters is extracted from the received video data and video quality is measured by comparing the two sets of parameters. However, a disadvantage of the reduced-reference method is that an additional bandwidth is required for a downlink channel since additional parameters must be transmitted.

The NR (no-reference) method is used to estimate video quality by analyzing a bit stream contained in MPEG-2 TS (Moving Picture Experts Group-2 Transport Stream). Since, in the no-reference method, video quality is measured by using only decoded processed video sequences without any information on reference video sequences, a disadvantage of the no-reference method is that the accuracy of this method is poor compared to accuracy of the other methods.

Meanwhile, bandwidths are a very important resource in communication systems. In particular, since the bandwidth is limited and expensive in wireless communication systems, it is necessary to minimize additional bandwidths required for monitoring video quality at a receiver.

Although a receiver may measure video quality using a no-reference method in order to minimize additional bandwidth, it is very difficult and inaccurate because the method does not use the reference video sequence. On the other hand, a reduced-reference method has a limitation in that an additional bandwidth is needed.

Furthermore, in order to measure errors occurring during transmission at the receiver, information on the reference video sequence is needed, thus consuming a channel resource.

DISCLOSURE OF THE INVENTION

Accordingly, the present invention solves the aforementioned problems occurring in the prior art. An object of the present invention is to provide methods and apparatus that measure transmission quality of multimedia data without consuming additional downlink channel resources.

In order to accomplish the object, the present invention provides methods of measuring transmission quality of multimedia data, including the steps of (a) a transmitter transmitting multimedia data through a channel; (b) a receiver, which has received the multimedia data from the transmitter, transmitting information on errors occurring during the transmission of the multimedia data to the transmitter through a return channel; (c) the transmitter estimating the received data at the receiver using the error information sent to the transmitter, and (d) the transmitter measuring the transmission quality of the received data by comparing the estimated received data with the reference data.

The method of measuring transmission quality may further include the step of (e) selectively maintaining or changing a transmission state of multimedia data through the channel depending on the result of transmission quality evaluation.

In addition, in order to accomplish the aforementioned object, the present invention provides an APPARATUSES FOR measuring transmission quality of multimedia data, which includes a transmitter transmitting multimedia data through a channel; and a receiver receiving the multimedia data, detecting errors, which occur during the channel transmission, from the multimedia data, and transmitting the information on the detected errors to the transmitter through a return channel.

The transmitter may include an encoding unit encoding source multimedia data; an estimation unit estimating the received data received at the receiver using the error information sent by the receiver; and an evaluation unit evaluating the transmission quality of the received data by comparing the estimated received data with the reference data.

Furthermore, the transmitter may further include a control unit for selectively maintaining or changing a transmission state of multimedia data through the channel depending on the result of transmission quality evaluation

BRIEF DESCRIPTION OF THE DRAWINGS

The aforementioned and other objects, features and other advantages of the present invention will be more clearly understood from the following detailed description taken in conjunction with the accompanying drawings, in which.

BEST MODE FOR CARRYING OUT THE INVENTION

The construction and operation of methods and apparatuses for measuring transmission quality of multimedia data according to a preferred embodiment of the present invention are described below in details with reference to the accompanying drawings.

In the present invention, transmitted multimedia data include video data, audio data, and text data. Preferred embodiments described below are illustrated mainly for transmission of video data which are one of the multimedia data types. It is noted that those skilled in the art can easily extend the idea and teaching of the quality measurement of video data described below to transmission quality measurements of audio and text data in a similar manner.

Figure 1:
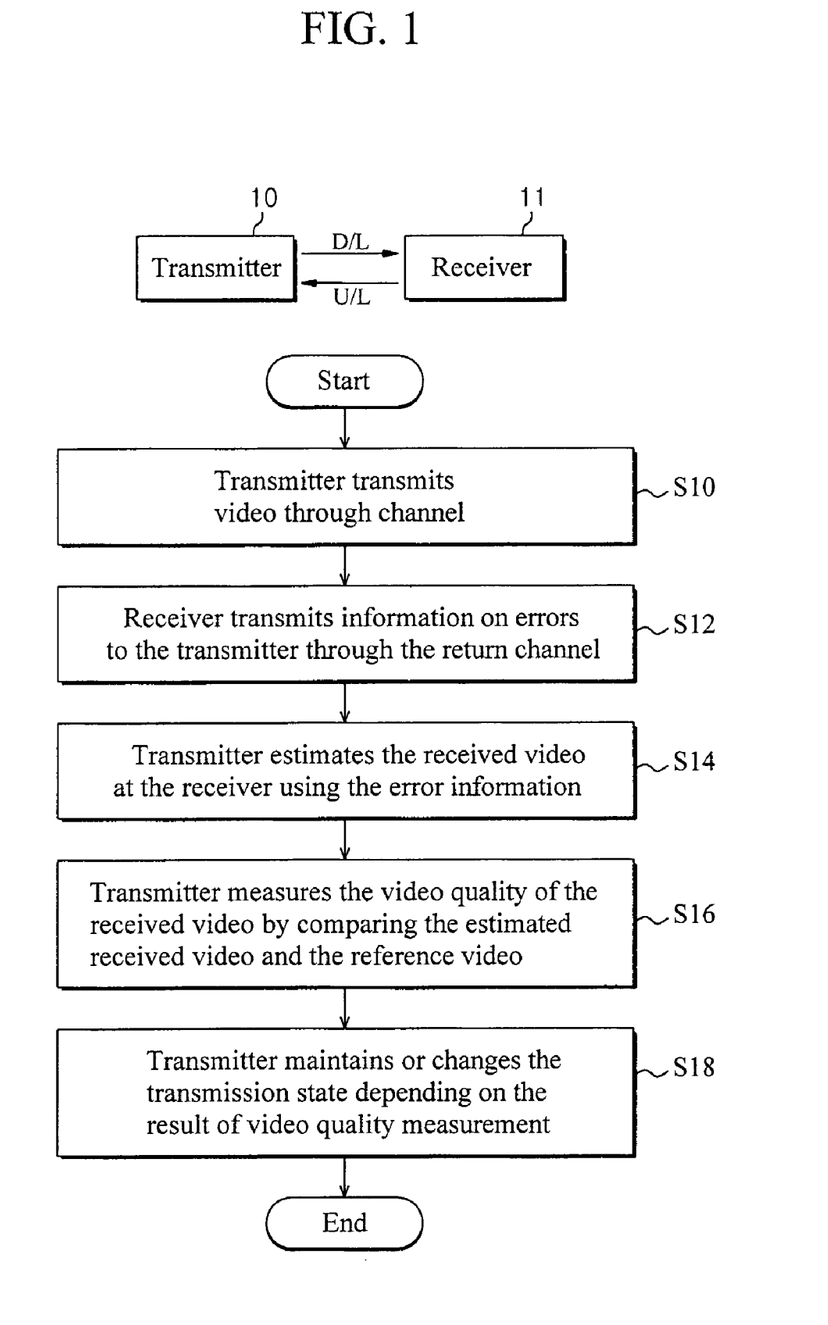
FIG. 1 is a flowchart which illustrates a video transmission method that controls transmission errors according to the present invention.

FIG. 1 is a flowchart which illustrates a video transmission method that controls transmission errors according to the present invention.

As shown in FIG. 1, in the method for measuring transmission quality of video according to the present invention, which is performed through downlink (D/L) and return (U/L) channels between a transmitter 10 and a receiver 11, the transmitter 10 transmits video through the channel (step S10). Having received the video transmitted through the channel, the receiver 11 transmits information on errors, which occurs during transmission, to the transmitter 10 through the return channel (step S12).

Furthermore, the method may be implemented in such a way that error information is sent only when an error is actually detected. In addition, the receiver 11 may also compensate errors using an error concealment technique. In this case, the error information sent to the transmitter 10 also includes information on the error concealment technique.

In addition, the receiver 11 may extract a set of parameters, which can be used for video quality assessment at the transmitter 10, from the video segment affected by errors and send the parameters, which a reduced-reference method uses, to the transmitter 10 along with error information. Then, the transmitter 10 can measure the video quality of the video segment affected by errors using a reduced-reference method.

Next, the transmitter 10 estimates the received video at the receiver 11 using the error information (step S14). The received video can be estimated using the returned error information and the transmitted video.

It is noted that all the information on the decoder at the receiver 20 is available at the transmitter 10. In other words, the transmitter has information on the decoder type at the receiver 20, post-processing techniques used at the receiver 20, etc. In certain applications, the receiver 20 can send this information to the transmitter 10 at the beginning of communication.

Then, the transmitter 10 measures the video quality of the received video by comparing the estimated received video and the reference video (step S16), and either maintains or changes the transmission state depending on the result of video quality measurement (step S18).

The video quality measurement method which can be used at step S16 includes a full-reference method, a reduced-reference method, and a no-reference method.

The full-reference method is the most accurate method for measuring video quality because it uses both reference (source) video and processed video sequences. The reduced-reference method measures transmission quality by comparing a set of parameters extracted from the reference video sequence with a set of parameters extracted from the processed video sequence. The no-reference method measures transmission quality using only a processed video sequence without using the reference video sequence and can be used to estimate video quality by analyzing a bit stream contained in an MPEG-2 TS.

Thus, the full-reference model can be used when source videos are available at the transmitter. When source videos are not available at the transmitter, a reduced-reference model can be used if the required set of parameters is available. This method is preferable when compressed video data and parameter data, which are extracted from source videos, are available at the transmitter. The no-reference model is used when neither source videos nor parameter data are available. However, it is noted that in most cases, compressed video data are available at the transmitter. Thus, if a compressed video is used as a reference video, a full-reference method can be used.

The present invention does not waste downlink channel resources since transmission quality is measured at the transmitter. In other words, regardless of the choice of the full-reference, reduced-reference and no-reference methods as a transmission quality measurement method, the present invention does not waste the downlink channel bandwidth for transmission quality measurement.

On the other hand, errors, which may occur in digital communications, include packet loss, bit errors, time delay, jitter, and so forth. Thus, in digital communications, if no errors occur during the transmission process, the transmission quality of the processed video at the receiver 11 is the same as that of the transmitted video at the transmitter 10. Furthermore, if the receiver 11 notifies the transmitter 10 that no error has occurred or if there is no returned error message, the transmitter recognizes that the transmission quality of the processed video in the receiver 11 is the same as that of the transmitted video from the transmitter 10.

In order to change the transmission state at step S18, at least one of the operations of terminating video transmission, increasing the downlink channel bandwidth for video transmission, applying an error correction technique, and switching to another CODEC robust against channel errors may be performed.

Figure 2:
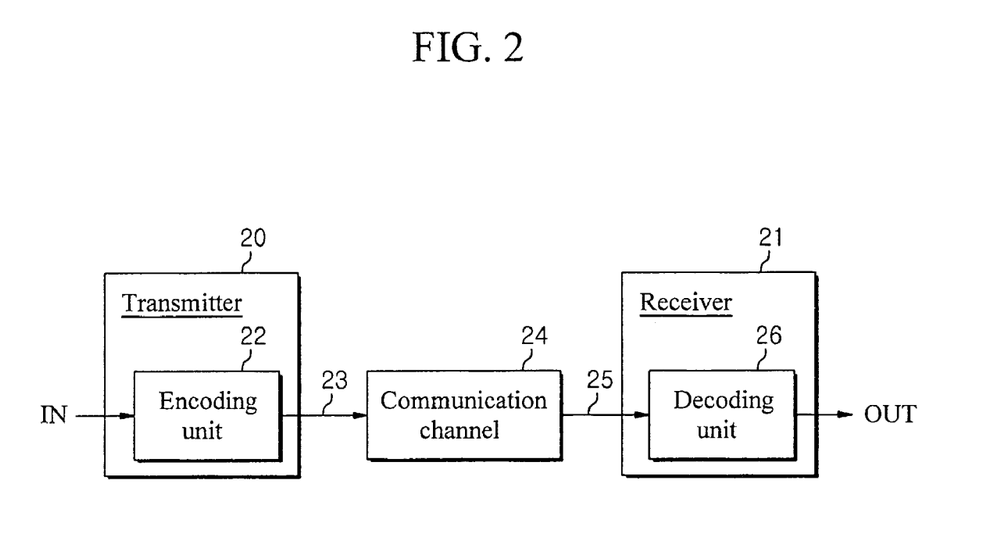
FIG. 2 is a block diagram which illustrates an encoder on the transmitter and a decoder on the receiver in a digital communication system.

Generally, in digital communications, video data are compressed by an encoder and then transmitted in a digital format. FIG. 2 is a block diagram which illustrates an encoder on the transmitter and a decoder on the receiver in a digital communication system.

As shown in FIG. 2, the source video IN is compressed by an encoding unit 22 of a transmitter 20 and then transmitted as encoded video 23 through a communication channel 24.

In this case, the data 23, which is compressed is and transmitted, called as transmitted compressed video data (in the case of multimedia, as transmitted compressed multimedia data), and the data 25, which is transmitted through the communication channel 24 and received by the receiver is called as received compressed video data (in the case of multimedia, received compressed multimedia data). If no error has occurred in the communication channel 24, the transmitted compressed video data 23 and the received compressed video data 25 are identical. The video, which can be obtained by decoding the transmitted compressed video data at the transmitter, is referred to as transmitted video.

Similarly, the video obtained by decoding the received compressed video data is referred to as received video. If no error has occurred during the transmission, the transmitted video and the received video are identical in digital communications.

The communication channel 24 can be a wired transmission medium which physically connects the transmitter 20 to the receiver 21 and/or a wireless transmission medium. The wired transmission medium may be implemented by using a twisted pair, a coaxial cable, or an optical fiber. Furthermore, the communication channel 24 may include a repeater, a router, and/or a gateway depending on a communication distance and a network structure.

The signal 25, which experienced attenuation and distortion while the video was transmitted through the communication channel 24, is inputted to the receiver 21. When the video is played at the receiver, the attenuation and distortion may cause errors. In this case, the error occurrence frequency can be represented by a BER (bit error rate).

The communication channel 24 may be constructed using various transmission media that range from a high reliability medium having a low BER, such as the optical fiber, to a low reliability medium having a high BER, such as wireless transmission. In the case of wireless communication having a high BER, it is important to improve the reliability of communication service through error controls.

A decoding unit 26, which is included in the receiver 21, decodes the received compressed video data 25 and outputs the received video OUT. In order to minimize video degradation, which has occurred in the communication channel 24, the decoding unit 26 may use an error concealment technique during the decoding process to compensate errors.

Figure 3:
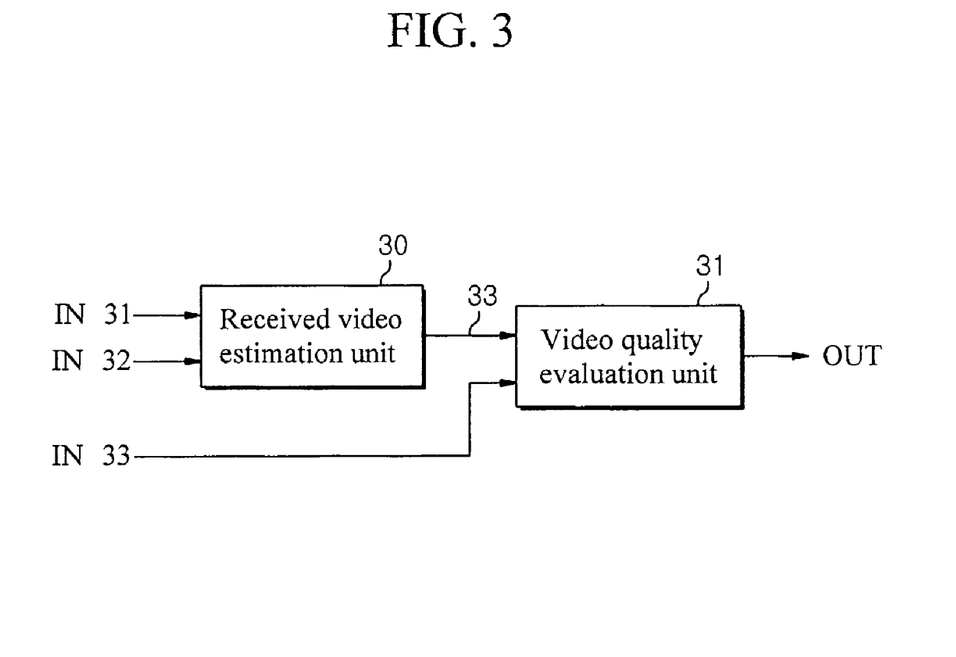
FIG. 3 is a block diagram which illustrates a video quality evaluation unit included in the transmitter according to the present invention.

FIG. 3 is a block diagram illustrating an apparatus, which is included in the transmitter, for measuring the transmission quality of video according to a preferred embodiment of the present invention.

In the transmitter, a received video estimation unit 30 at the transmitter estimates the received video using the error information IN31 and the transmitted video IN32. As described previously, the transmitted video IN32 is obtained by decoding the transmitted compressed video data. It is assumed that all necessary information on the CODEC and its parameters are available to the received video estimation unit 30. It is noted that the received video estimation unit 30 may estimate the received video using the error information IN31 and the transmitted compressed video data. Thus, it should be understood that the compressed video generation unit and the received video estimation unit 30 belong to an apparatus and share all necessary information.

The video quality evaluation unit 31 compares the estimated received video 33 with the reference video IN33 to measure the transmission video quality of the received video containing errors.

Figure 4:
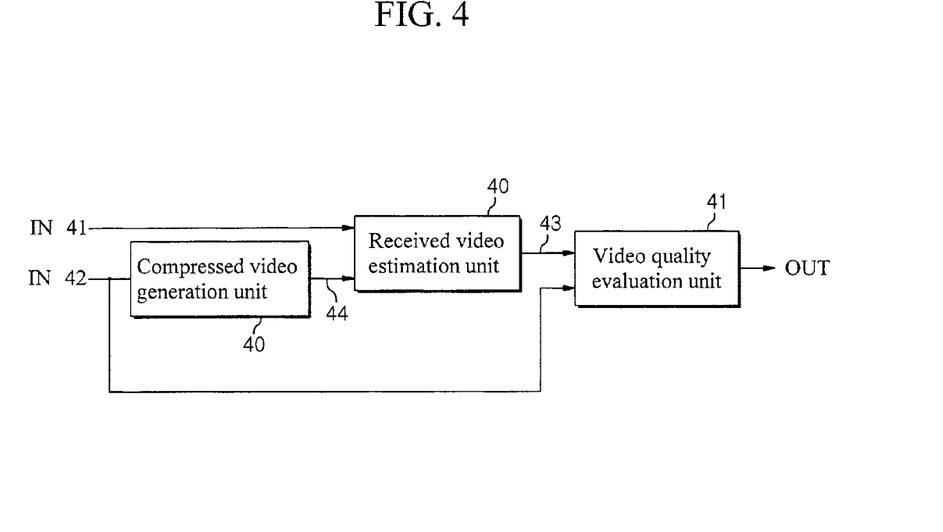
FIGS. 4 and 5 are embodiment examples of the unit shown in FIG. 3.
Figure 5:
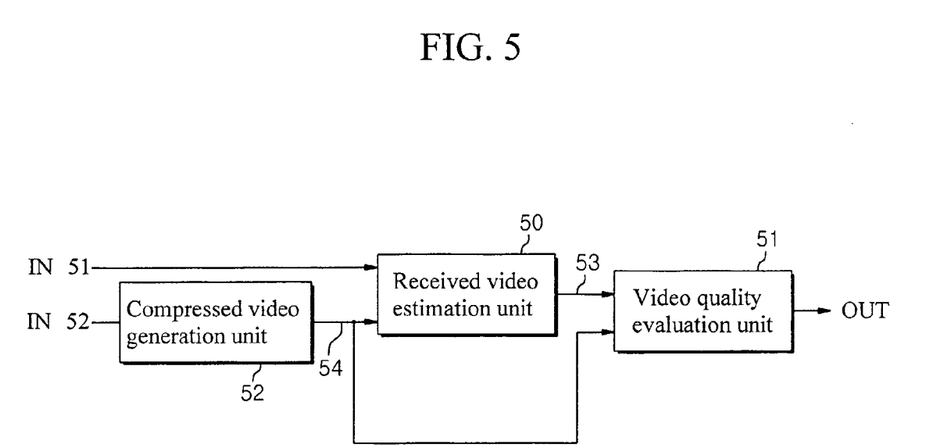

FIGS. 4 and 5 are embodiments of the apparatus shown in FIG. 3.

First the received video estimation unit 40 of FIG. 4 estimates the received video received by the receiver using the transmitted video 44, which a compressed video generation unit 42 generates using the source video IN42, and the error information IN41, which is returned from the receiver.

It is noted that the compressed video generation unit 42 and the received video estimation unit 40 are parts of an apparatus and share all necessary information such as information on the CODEC and its parameters. In this sense, the received video estimation unit 40 may also use the transmitted compressed video data and the error information to estimate the received video.

The video quality evaluation unit 41 compares the estimated received video 43 with the source video IN42 to estimate the video quality of the received video containing errors. In this case, the compressed video generation unit 42 may be implemented by connecting an encoder and a decoder. It is also noted that the compressed video generation unit 42 can be viewed as a part of the received video estimation unit 40.

Meanwhile, the received video estimation unit 50 of FIG. 5 produces the estimated received video 53 using the error information IN51 which is transferred from the receiver and the transmitted video 54.

The video quality evaluation unit 51 compares the estimated received video 53 with the transmitted video 54 to estimate the video quality of the received video containing errors. In this case, the compressed video generation unit 52 may be implemented by connecting an encoder and a decoder.

The embodiment of FIG. 5 can be used when the source video is not available at the transmitter.

Figure 6:
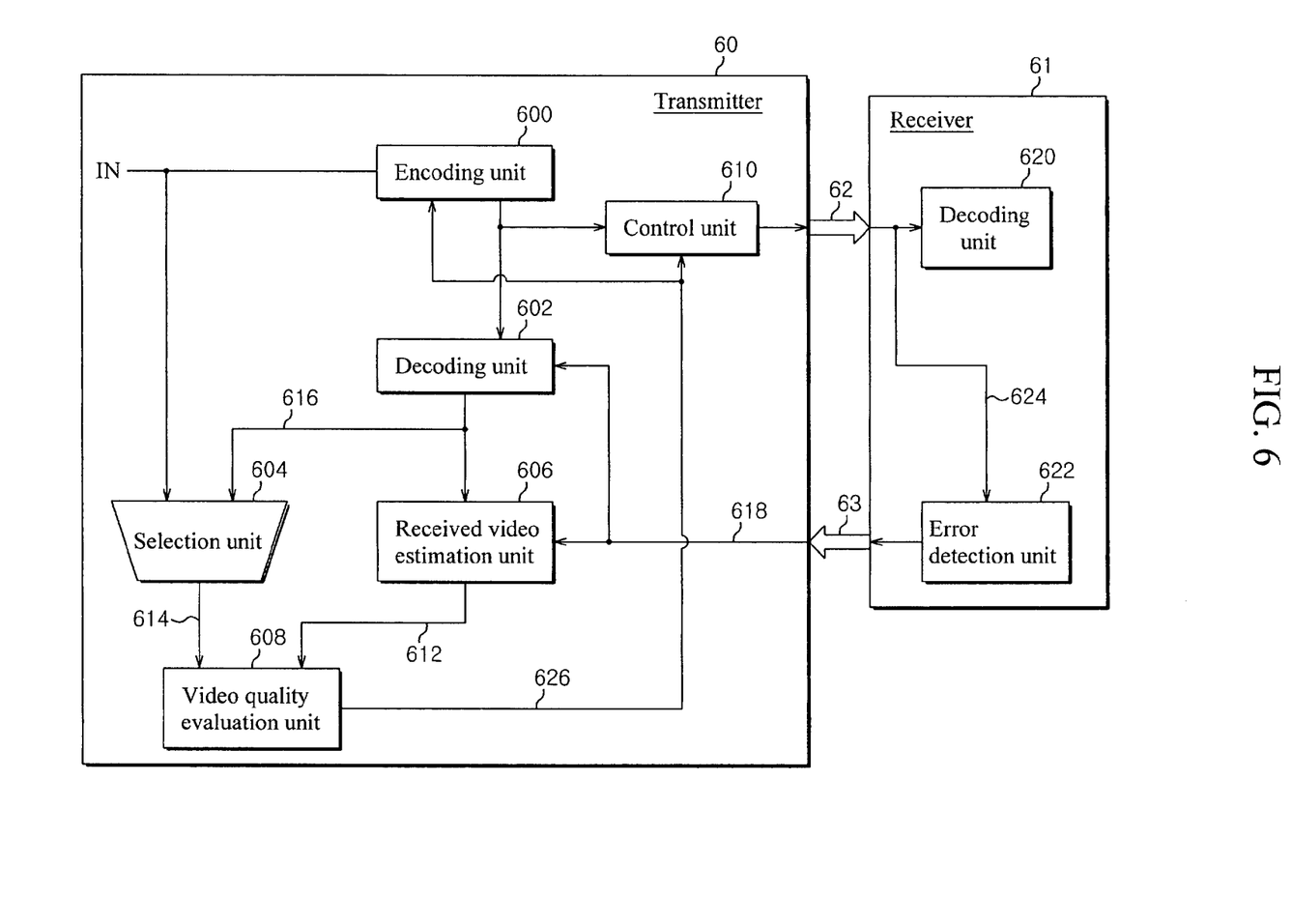
FIG. 6 is a block diagram which illustrates a most preferred embodiment of the present invention.

FIG. 6 is a block diagram illustrating a video transmission system according to the most preferred embodiment of the present invention.

A transmitter 60 includes an encoding unit 600, a decoding unit 602, a selection unit 604, a received video estimation unit 606, a video quality evaluation unit 608 and a control unit 610. A receiver 61 includes a decoding unit 620 and an error detection unit 622.

The encoding unit 600 generates encoded video data by compressing a source video IN and the decoding unit 602 generates a transmitted video 616 by decoding the encoded video data.

The received video estimation unit 606 estimates the received video at the receiver using error information 618 and the transmitted video 616. In this case, the received video estimation unit 606 may include memory of a predetermined size to perform temporal alignment between the error information 618 and the transmitted video 616. It is also noted that the compressed video generation unit and the received video estimation unit 606 are parts of an apparatus and share all necessary information such as information on the CODEC and its parameters.

Furthermore, the selection unit 604 selects either the transmitted video 616 outputted from the decoding unit 602 or the source video IN inputted to the transmitter 60, and outputs it to the video quality evaluation unit 608 as a reference video 614 that will be used for video quality evaluation.

The selection unit 604 may include a memory of a predetermined size to synchronize the reference video 614 and the estimated received video 612. In this case, the video quality evaluation unit 608 receives the reference video 614 for video quality evaluation and the estimated received video 612, which are temporally aligned.

The video quality evaluation unit 608 compares the estimated received video 612 with the reference video 614 to measure the video quality of the received video, which is transmitted with transmission errors. In this case, any one of a full-reference method, a reduced-reference method, and a no-reference method may be used as a method of video quality measurement.

In case that a no-reference method are used, when the transmitter 60 transmits multimedia data through a channel, the receiver 61 detects errors, which occurs in the channel, from the multimedia data, and extracts a set of parameters from a video segment which are affected by the errors the transmitter 60 through a return channel.

And then, the video quality evaluation unit 608 evaluates the transmission quality of the received data by using the set of parameters and reference data.

The transmitter 60 may maintain or change the current video transmission state through the channel depending on the evaluation result 626 of the video quality evaluation unit 608. As a possible action, at least one of the operations of terminating video transmission, increasing the channel bandwidth, applying an error correction technique, and switching to another CODEC robust against channel errors may be performed.

For the purpose of controlling video transmission, the transmitter 60 may further include the control unit 610. The control unit 610 may terminate video transmission or increase the channel bandwidth as a changing action.

Furthermore, depending on the evaluation result 626, the encoding unit 600 may apply an error correction technique or switch to another CODEC which is robust against channel errors, thus improving the reliability of video transmission and preventing bandwidth waste.

The decoding unit 620, which is included in the receiver 61, decodes the encoded video which is transmitted through a downlink channel 62.

The error detection unit 622, which is included in the receiver 61, detects errors in the received compressed video data, and the information on the errors detected by the error detection unit 622 is transmitted to the transmitter 60 through a return channel 63. The error information may include information on packet loss, bit errors, jitter, delay, etc. Since the error information is returned only when errors are detected and the bandwidth required to return the error information is small, the consumption of the return channel resource can be minimized.

Meanwhile, the decoding unit 620 may include means for error concealment. When several blocks of a video are lost at the receiver due to the occurrence of packet loss or bit errors, an error concealment technique may partly reconstruct lost blocks from the pixels of adjacent frames. In this case, the returned error information 618 should include information on the error concealment technique which is used in the decoding unit 620 of the receiver 61.

The method of measuring transmission quality of multimedia data according to the present invention may be implemented as computer-readable code stored in a computer-readable recording medium. The computer-readable recording medium includes all kinds of recording devices in which programs or data, which can be read by a computer system, are stored.

For example, the computer-readable recording medium includes a ROM (Read-Only Memory), a RAM (Random Access Memory), a CD (Compact Disk)-ROM, a magnetic tape, a hard disk, a floppy disk, flash memory, and an optical data storage device. The computer-readable code stored in a recording medium refers to a series of instructions The program stored in the recording medium refers to one that is represented by a series of instructions directly or indirectly used in an apparatus having information processing capability, such as a computer, m order to obtain a predetermined result. Accordingly, the terminology, computer, is used to collectively refer to apparatuses that are equipped with memory, input and output devices, and operation device, and have information processing capability to perform specific functions using programs regardless of the names thereof. Furthermore, the method of measuring transmission quality of multimedia data according to the present invention may be written using a schematic or a VHDL (Very High speed integrated circuits Description Language), and may be implemented using a programmable integrated circuit connected to a computer such as a FPGA (Field Programmable Gate Array). Furthermore, the concept of the recording medium includes programmable integrated circuits or an ASIC (Application Specific Integrated Circuit).

INDUSTRIAL APPLICABILITY

As described previously, in accordance with the present invention, the methods and apparatuses for measuring transmission quality according to the present invention can improve the reliability of multimedia data transmission since the transmitter can perform quality measurement of multimedia data and adaptively change the current transmission state. Furthermore, an advantage of the present invention is that a transmission service provider can monitor users' service states using evaluation results and use it as a part of service contracts.

Furthermore, since the quality evaluation of transmitted data is not performed at the receiver, the transmitter does not need to transmit parameter data for quality evaluation to the receiver and the additional bandwidth resource of the downlink channel needed for quality measurement of transmitted data is not consumed.

Since the present invention may be implemented in some other forms by those skilled in the art without departing from the technical ideas or essential characteristics thereof, it should be understood that the previously-described embodiments are illustrative and not restrictive from all the aspects. The scope of the present invention is defined by the following claims rather than the detailed descriptions and it should be understood that any modifications and variations derived from the claims and the equivalents thereof are all included in the scope of the present invention.

The invention claimed is:

1. A method of measuring transmission quality of multimedia data, comprising the steps of:
    (a) a transmitter transmitting multimedia data, based on reference multimedia data, through a forward channel to a receiver;
    (b) the transmitter receiving, through a return channel, transmission error information on errors occurring during the multimedia data transmission to the receiver;
    (c) estimating, at the transmitter, multimedia data received by the receiver using the received transmission error information and the transmitted multimedia data;
    (d) measuring, at the transmitter, a transmission quality of the multimedia data received by the receiver by comparing the estimated received multimedia data with the reference multimedia data; and
    (e) performing at least one of the operations of terminating video transmission, increasing the channel bandwidth, and switching from one CODEC to another depending on evaluation results of transmission quality.

2. The method according to claim 1, wherein the step (b) is performed only when a transmission error of the transmitted multimedia data is detected.

3. The method according to claim 1, further comprising applying an error concealment technique to the received multimedia data.

4. The method according to claim 3, further comprising the transmitter receiving error concealment technique information through the return channel.

5. The method according to claim 1, wherein in step (d), the reference data is obtained by decoding the transmitted multimedia data.

6. The method according to claim 1, wherein measuring the transmission quality uses any one of a full-reference method, a reduced-reference method, and a no reference method.

7. The method according to claim 1, further comprises:
(e) selectively maintaining or changing a transmission state of the multimedia data through the channel after measuring the transmission quality.

8. The method according to claim 7, wherein the step (e) includes changing the transmission state by performing at least one of operations of terminating video transmission, increasing the channel bandwidth, employing an error correction technique, and switching from one CODEC to another CODEC depending on evaluation results of transmission quality.

9. An apparatus for measuring transmission quality of multimedia data, comprising:
a transmitter for transmitting multimedia data based on reference multimedia data through a forward channel to a receiver, wherein the transmitter comprises:
an encoding unit for encoding source multimedia data to encoded multimedia data,
a received video estimation unit for receiving, on a return channel, transmission error information on received multimedia data, and estimating the received multimedia data using the received transmission error information and the transmitted multimedia data, and
an evaluation unit for evaluating the transmission quality of the received multimedia data by comparing the estimated received multimedia data with the reference multimedia data; and
a control unit for performing at least one of the operations of terminating video transmission, increasing the channel bandwidth, and switching from one CODEC to another depending on evaluation results of transmission quality.

10. The apparatus according to claim 9, wherein the received video estimation unit is configured to receive error information only when an error occurs in the forward channel.

11. The apparatus according to claim 9, further comprising a receiver configured to receive the transmitted multimedia data, the receiver including means for compensating errors by applying an error concealment technique to the received multimedia data.

12. The apparatus according to claim 11, wherein the receiver is configured to transmit information on the error concealment technique and the transmission error information to the transmitter through the return channel.

13. The apparatus according to claim 9, wherein the reference data is the transmitted multimedia data.

14. The apparatus according to claim 9, wherein the evaluation unit is configured to evaluate the transmission quality using any one of a full-reference method, a reduced-reference method, and a no reference method.

15. The apparatus according to claim 9, wherein the transmitter further comprises:
a control unit for selectively maintaining or changing a transmission state of the multimedia data through the forward channel depending on an evaluation result of transmission quality.

16. The apparatus according to claim 15, wherein the control unit is configured to perform at least one of terminating video transmission and increasing the channel bandwidth, depending on the evaluation result.

17. The apparatus according to claim 15, wherein the encoding unit is configured to perform at least one of applying an error correction technique and switching from one CODEC to another CODEC depending on the evaluation result.

18. A method of measuring transmission quality of multimedia data, comprising the steps of:
(a) transmitting multimedia data, based upon reference multimedia data, through a channel by a transmitter to a receiver;
(b) extracting a set of parameters from a video segment of received multimedia data affected by transmission errors;
(c) transmitting the extracted set of parameters to the transmitter through a return channel; and
(d) measuring, at the transmitter, a transmission quality by using the set of parameters and the reference multimedia data; and
(e) performing at least one of the operations of terminating video transmission, increasing the channel bandwidth, and switching from one CODEC to another depending on evaluation results of transmission quality.

19. An apparatus for measuring transmission quality of multimedia data, comprising:
a transmitter for transmitting multimedia data, based on reference multimedia data, through a channel; and
a receiver for:
receiving the transmitted multimedia data,
detecting transmission errors in the transmitted multimedia data,
extracting a set of parameters from a video segment affected by the transmission errors, and
transmitting the set of parameters through a return channel to the transmitter,
wherein the transmitter comprises:
an encoding unit for encoding source multimedia data to encoded multimedia data, and
an evaluation unit for evaluating a transmission quality of the received multimedia data using the set of parameters and the reference multimedia data; and
a control unit for performing at least one of the operations of terminating video transmission, increasing the channel bandwidth, and switching from one CODEC to another depending on evaluation results of transmission quality.

* * * * *